US007000356B2

(12) United States Patent
Tamai et al.

(10) Patent No.: US 7,000,356 B2
(45) Date of Patent: Feb. 21, 2006

(54) TRANSPARENT PLATE WITH A MOLDING AND METHOD FOR DISASSEMBLING TRANSPARENT PLATE

(75) Inventors: Nobuyuki Tamai, Aichi (JP); Shigehiko Iguchi, Aichi (JP)

(73) Assignee: Asahi Glass Company, Limited, Tokyo (JP)

( * ) Notice: Subject to any disclaimer, the term of this patent is extended or adjusted under 35 U.S.C. 154(b) by 252 days.

(21) Appl. No.: 10/170,383

(22) Filed: Jun. 14, 2002

(65) Prior Publication Data

US 2003/0005563 A1 Jan. 9, 2003

Related U.S. Application Data

(63) Continuation of application No. PCT/JP00/08818, filed on Dec. 13, 2000.

(30) Foreign Application Priority Data

Dec. 14, 1999 (JP) .................... 11-354666

(51) Int. Cl.
*E04B 1/00* (2006.01)
(52) U.S. Cl. .................. 52/99; 52/208; 52/204.62; 52/204.69; 52/204.591; 52/745.1; 52/745.2; 296/96; 296/146.15; 296/201; 428/343
(58) Field of Classification Search .......... 52/98, 52/99, 208, 204.591, 204.62, 204.69, 745.15, 52/745.16, 745.2; 296/93, 201, 146.15; 428/343
See application file for complete search history.

(56) References Cited

U.S. PATENT DOCUMENTS 3,514,916 A * 6/1970 Hoverman, Jr.
4,551,372 A * 11/1985 Kunert ......................... 428/38
4,635,415 A 1/1987 Schumacher et al.
4,833,847 A * 5/1989 Inayama et al. .............. 52/208
4,986,867 A * 1/1991 Braendle et al. ....... 156/244.11
4,994,315 A * 2/1991 Screiber et al. ............... 428/76
5,095,669 A * 3/1992 Kunert et al. ................. 52/171
5,391,416 A * 2/1995 Kunert ......................... 428/122
5,519,979 A * 5/1996 Kunert et al. ............. 52/745.15
5,620,794 A * 4/1997 Burkert et al. .............. 428/343
5,806,257 A * 9/1998 Cornils et al. ................ 52/208
5,906,697 A * 5/1999 Hasegawa et al. .......... 156/108
5,988,730 A * 11/1999 Bekaert ................. 296/146.15
6,332,640 B1 * 12/2001 Cornils et al. ................ 296/93

(Continued)

FOREIGN PATENT DOCUMENTS

DE         4445095         6/1996

(Continued)

Primary Examiner—Carl D. Friedman
Assistant Examiner—Yvonne M. Horton
(74) Attorney, Agent, or Firm—Oblon, Spivak, McClelland, Maier & Neustadt, P.C.

(57) ABSTRACT

A molding includes an attaching portion to be bonded to an interior side of a peripheral edge of a glass plate and an elastic portion capable of being in close contact with a window opening. The molding is made of thermoplastic resin and has an electrically conductive member insert-molded therein, the electrically conductive member extending substantially parallel to a surface of the glass plate and generating heat by bringing an eddy current generator near thereto. The eddy current generator is brought near a surface of the transparent plate to generate heat in the electrically conductive member, thereby softening or melting the molding, and an external force is applied to the transparent plate to disassemble the transparent plate from the window opening of an automobile.

19 Claims, 8 Drawing Sheets

U.S. PATENT DOCUMENTS 6,513,854 B1 * 2/2003 Largue et al. ................ 296/93

FOREIGN PATENT DOCUMENTS

| DE | 19511657 | 10/1996 |
|----|----------|---------|
| EP | 0128837  | 12/1984 |
| EP | 0545896  | 6/1993  |
| EP | 0959118  | 11/1999 |
| JP | 58-173619 | 10/1983 |
| JP | 3-70626  | 3/1991  |
| JP | 07-81393 | 3/1995  |
| JP | 7-81393  | 3/1995  |
| JP | 8-118448 | 5/1996  |
| JP | 10-684   | 1/1998  |
| WO | 96/17737 | 6/1996  |

* cited by examiner (A)

(B)

though the molding has an electrically conductive member therein.

TRANSPARENT PLATE WITH A MOLDING AND METHOD FOR DISASSEMBLING TRANSPARENT PLATE

CROSS REFERENCE TO RELATED APPLICATION

This application is a continuation of International Application No. PCT/JP00/08818 filed on Dec. 13, 2000 and claims priority to Japanese Application No. 11-354666, filed on Dec. 14, 1999, and the entire content of both applications is hereby incorporated by reference.

TECHNICAL FIELD

The present invention relates to a transparent plate with a molding and a method for disassembling a transparent plate, in particular a transparent plate with a molding for an automobile window and a method for disassembling a transparent plate for an automobile window.

BACKGROUND ART

As shown in FIGS. 9 and 10, a transparent plate with a molding 71, which is used for the windshield of an automobile 70, includes a glass plate 72 having a substantially trapezoidal shape as viewed in a plan view (when viewed in a plan view) and curved in a two dimensional direction or a three dimensional direction, and a resin molding 80 extending along an upper side 73 and both lateral sides 74, 74 forming a peripheral edge of the glass plate 72. The transparent plate with a molding 71 is fitted into an opening (window opening) 75 formed in a body panel 70A.

The molding 80 is also called a frame, a gasket or the like. This specification uses the word "molding". The upper side 73 of the glass plate 72 means a side extending along a roof 76 of the automobile 70, and the lateral sides of the glass plate 72 mean sides extending along pillars 77 or other members of the automobile 70.

FIG. 11 shows the transparent plate with a molding 71, wherein the molding 80 is bonded only to an interior side 72A of the glass plate 72 (This structure will be, hereinbelow, referred to as "one-side molding"). The molding 80 includes an upper attaching portion 81 and lateral attaching portions 82 to be bonded to the interior side 72A along the upper side 73 and the lateral sides 74 of the glass plate 72, and a lip portion 83 extending in directions away from the upper attaching portion 81 and the lateral attaching portions 82 with respect to the glass plate 72.

The transparent plate with a molding 71 is fitted into and fixed to the opening 75 by a proper adhesive 86 interposed between a surface (on an exterior side) of a attaching flange 76 of the opening 75 and the molding 80. In that case, the lip portion 83 is elastically deformed to be in close contact with a sidewall 75A of the opening, providing a water proofing property between the opening 75 and the upper and lateral sides 73 and 74 of the glass plate 72.

The transparent plate with a molding 71 can be produced by, e.g., an encapsulation method wherein melted resin is injected into a cavity space of a mold with the glass plate 72 provided therein to form the molding 80 along the upper side 73 and the lateral sides 74, 74 of the glass plate 72.

In late years, the glass plate for an automobile 72 has been demanded to be capable of being easily disassembled from the body panel 70A mainly from the viewpoint of the recycling of industrial products. However, it has been impossible to easily disassemble only the glass plane 72 since the transparent plate with a molding 71 is assembled to the body panel 70A by an adhesive in prior art.

It is an object of the present invention to provide a transparent plate with a molding and a method for disassembling a transparent plate, which can easily disassemble a transparent plate for the body panel of an automobile to facilitate recycling.

DISCLOSURE OF THE INVENTION

The present invention provides a transparent plate with a molding, which comprises at least a transparent plate to be assembled to a window opening of an automobile and a thermoplastic resin molding unified to a peripheral edge of the transparent plate; the molding including an attaching portion to be bonded to at least an interior side of the peripheral edge of the transparent plate and an elastic portion connected to the attaching portion so as to be capable of being in close contact with the window opening; and which is characterized in that the molding has an electrically conductive member insert-molded therein, the electrically conductive member extending substantially parallel to a transparent plate surface.

The transparent plate surface means an interior side of the transparent plate in the case of one-side molding, and an interior side and end faces of the transparent plate in the case of bonding the molding to the interior side and the end faces of the transparent plate. In the case of bonding the molding to the interior side and the end faces of the transparent plate, the electrically conductive member is provided to extend parallel to each of the interior side and the end faces of the transparent plate. In that case, the electrically conductive member of the interior side and the electrically conductive member of the end faces may be embedded in the molding independently of each other or be embedded in the molding as an integral part wherein both electrically conductive members are formed in continuous fashion to have a substantially L-character shape in section.

Examples of the electrically conductive member are a band plate shape of electrically conductive member and an electrically conductive member having granular shape or bar shape of portions distributed along a single surface.

In accordance with the present invention stated earlier, the molding is made of thermoplastic resin, and the molding has the electrically conductive member insert-molded therein, the electrically conductive member extending substantially parallel to the transparent plate surface. When the transparent plate is required to be disassembled from the window opening, an eddy current generator, such as a coil, can be brought near a surface of the transparent plate and heat the electrically conductive member by an eddy current generated therein to soften or melt the molding. In this manner, the transparent plate can be easily disassembled since the molding can be broken, the electrically conductive member serving as a boundary.

It is preferable that the electrically conductive member is a substantially strip shape of electrically conductive member. In this mode of the present invention, the molding can be softened or melted more efficiently since an eddy current generator, such as a coil, can be brought near a surface of the transparent plate to form a strip shape of heated region in the electrically conductive member.

It is preferable that the electrically conductive member is provided so as not to project from a surface of the molding. In this mode of the present invention, the transparent plate can be prevented from having a poor appearance since the electrically conductive member is fully embedded in the molding in such fashion to be invisible from outside. When the electrically conductive portion is provided to project from a surface of the molding, generated heat can be transferred to another member in touch with the molding in some cases. When the electrically conductive member is fully embedded in the molding, the generated heat can be effectively utilized for softening or melting the molding.

The present invention also provides a method for disassembling a transparent plate with a thermoplastic resin molding unified to a peripheral edge of thereof from a window opening of an automobile with the transparent plate assembled thereto by heating the molding, which is characterized in that the method comprises preliminarily providing the transparent plate with an electrically conductive member so as to cover at least one portion of the electrically conductive member with the molding, the electrically conductive member extending substantially parallel to a transparent plate surface; bringing an eddy current generator near a surface of the transparent plate to generate heat in the electrically conductive member, thereby softening or melting the molding; and applying an external force to the transparent plate to disassemble the transparent plate from the window opening of the automobile.

In accordance with the present invention, in order to disassemble the transparent plate from the window opening, it is sufficient only to bring the eddy current generator near a surface of the transparent plate and generate heat in the electrically conductive member to soften or melt the molding. As a result, it is possible to easily disassemble the transparent plate from the window opening of the automobile.

BEST MODE FOR CARRYING OUT THE INVENTION

Figure 10:
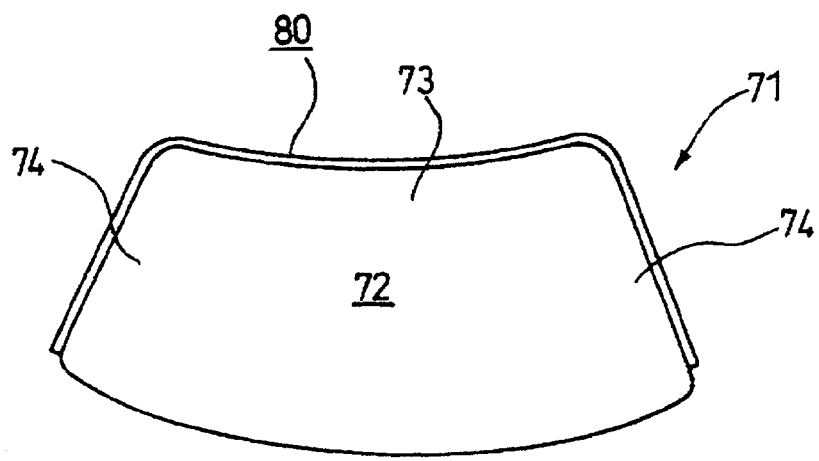
FIG. 10 is a plan view showing the transparent plate.
Figure 11:
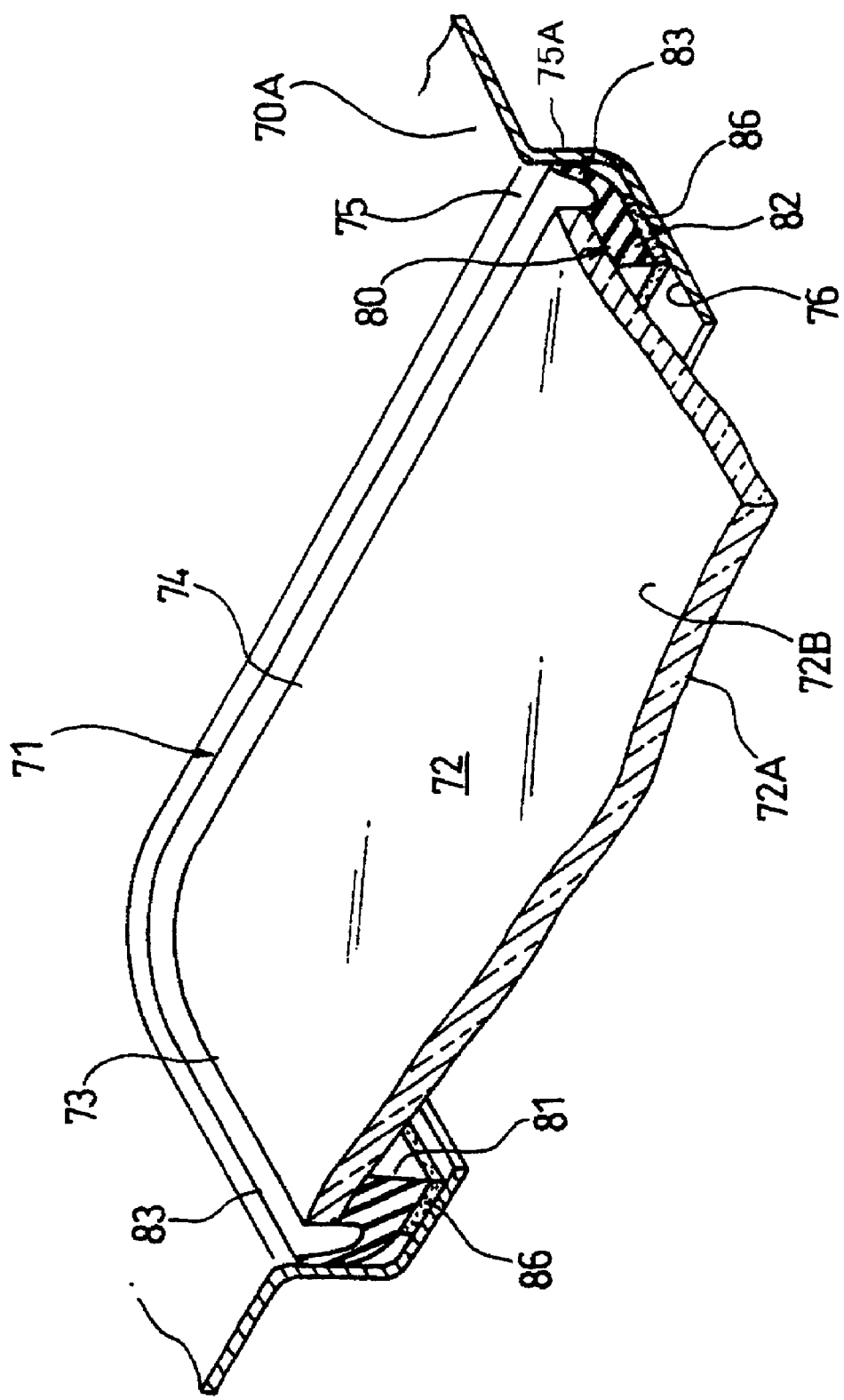
FIG. 11 is a perspective view showing a transparent plate with a conventional molding.

Now, embodiments of the present invention will be described in detail in reference to the accompanying drawings. In the explanation of the embodiments, parts similar to the parts explained with respect to FIG. 10 or FIG. 11 are indicated by identical or corresponding reference numerals in the drawings, and explanation of these parts will be simplified or omitted.

Figure 1:
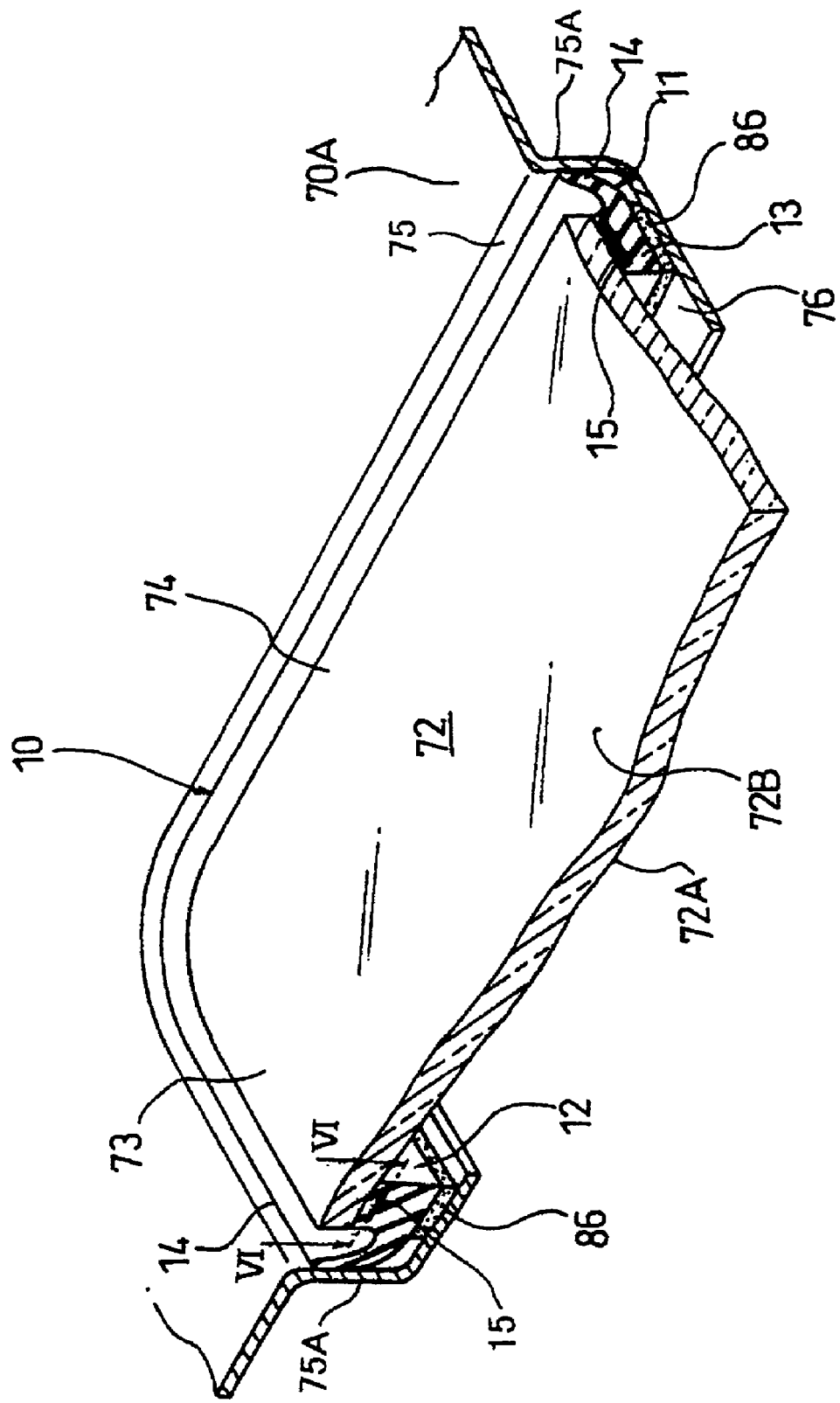
FIG. 1 is a fragmentary perspective view of the transparent plate with a molding according to a first embodiment of the present invention.
Figure 2:
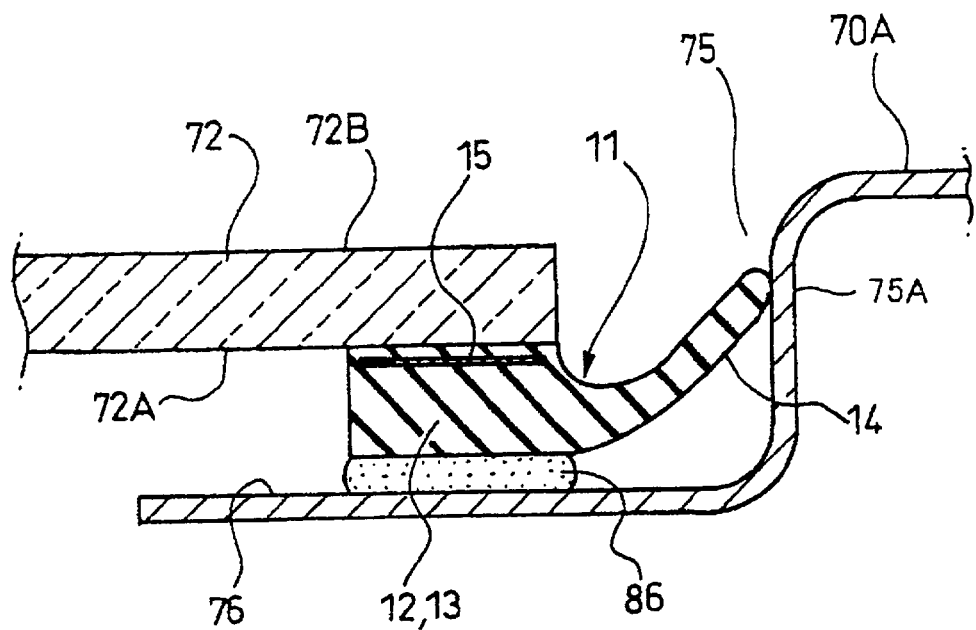
FIG. 2 is a cross-sectional view showing a peripheral edge of the transparent plate and the molding.

As shown in FIG. 1 and FIG. 2, the transparent plate with a molding 10 according to a first embodiment has a molding 11 provided thereto so as to extend an upper side 73 and lateral sides 74 as a peripheral edge of a glass plate 72. The transparent plate with a molding 10 is utilized as the windshield of an automobile.

The molding 11 includes an upper attaching portion 12 and lateral attaching portions 13 to be continuously bonded to an interior side 72A along the upper side 73 and the lateral sides 74 of the glass plate 72, and a lip portion 14 continuously extending from the attaching portions 12, 13 to be in close contact with a sidewall 75A of an opening.

The molding 11 is molded from thermoplastic resin, and the upper attaching portion 12 and the lateral attaching portions 13 have an electrically conductive member 15 insert-molded therein in continuous fashion, the electrically conductive member extending substantially parallel to the interior side 72A of the glass plate 72 and along a longitudinal direction of the molding 11. The electrically conductive member 15 comprises a substantially band plate shape of electrically conductive member or a strip shape of electrically conductive member, and the electrically conductive member is provided so as not to project from a surface of the molding 11. Although a sheet of silver foil is most suited to form the electrically conductive member, a sheet of copper or aluminum foil, a band plate or the like may be utilized.

The electrically conductive member 15, which is insert-molded in the molding, has a thickness of, e.g., 1–2 mm in order to prevent the flexibility of the molding from degrading.

The transparent plate with a molding 10 is engaged into and fixed to an opening 75 of a body panel 70A by using an adhesive 86 to bond the upper attaching portion 12 and the lateral attaching portions 13 of the molding 11 to a surface of an attaching flange 76 extending substantially parallel to the interior side 72A of the glass plate 72.

Figure 3:
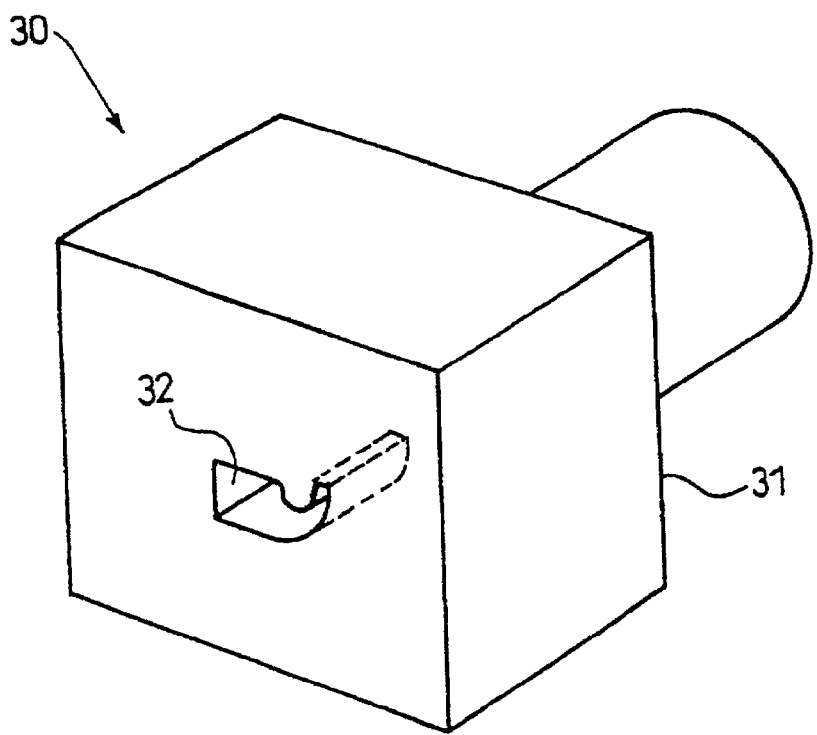
FIG. 3 is a schematic perspective view showing an extrusion molding die.

The molding 11 can be produced by continuously extruding an upper side molding portion and lateral side molding portions from, e.g., an extrusion molding die 30 shown in FIG. 3.

The extrusion molding die 30 includes a die main body 31 and a forming space 32 provided in the die main body 31. The extrusion molding die 30 extrudes a resin material so as to pass the material through the forming space 32 from a rear end toward a front end in this figure, producing the molding 11 in a desired cross-sectional shape. By supplying the electrically conductive member to the extrusion molding die concurrently with extrusion of the resin material, the molding 11 can be formed so as to have the electrically conductive member 15 insert-molded therein.

The resin used for the molding 11 is thermoplastic resin, such as polyvinyl chloride, a copolymer of vinyl chloride and ethylene, a styrene type elastomer, an olefin type elastomer, urethane resin, silicone resin, or vinyl chloride resin in a sol state.

The transparent plate with a molding 10 may be produced by a method wherein the molding 11 extruded from the extrusion molding die 30 is directly fitted to the upper side 73 and the lateral sides 74 of the glass plate 72 by moving or rotating the glass plate 72.

Figure 4:
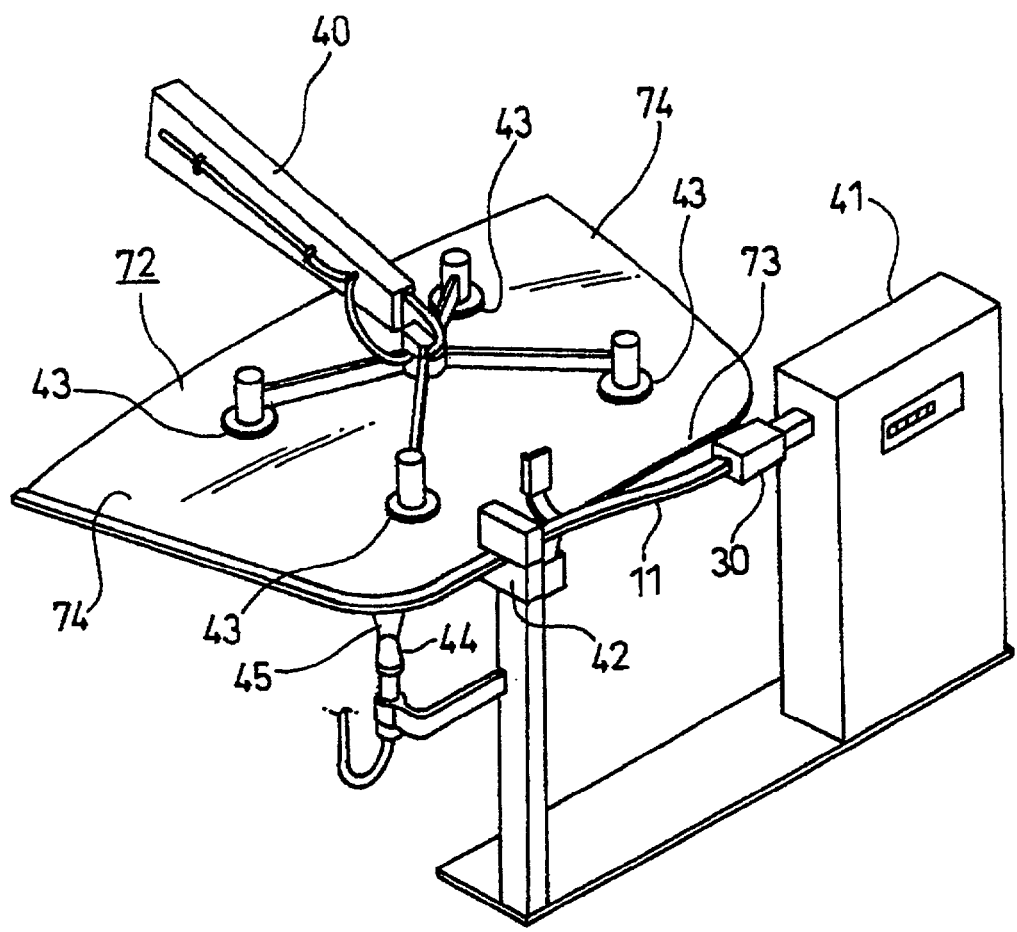
FIG. 4 is a perspective view showing a method for producing the transparent plate with a molding.

As specifically shown in FIG. 4, the glass plate 72, which has preliminarily had a primer (not shown) applied on the upper side 73 and the lateral sides 74, is supported by a supporting arm 40, and the molding 11, which has been extruded from an extruder 41 through the extrusion molding die 30, is supported by a pressing member 42.

The supporting arm 40 can move in a three dimensional direction, support the glass plate 72 at an arbitrary angle through suckers 43 provided on a leading edge of the supporting arm 40, and rotate the glass plate 72 about a line extending in the thickness direction of the glass plate 72. The upper attaching portion 12 and the lateral attaching portions 13 of the molding 11, which have been extruded from the extrusion molding die 30, are pressed against the interior side of the glass plate 72 to be bonded thereto by the pressing member 42.

The molding 11 is sequentially fitted to the upper side 73 and the lateral sides 74 of the glass plate 73 by rotating the glass plate 72 while providing the supporting arm 40 and the respective suckers 43 with cooperative movement so as to relatively move the pressing member 42 with respect to the upper side 73 and the lateral sides 74 of the glass plate 72.

At that time, the provision of the primer, which has been preliminarily applied on the upper side 73 and the lateral sides 74 of the glass plate 72, ensures that the molding 11 is fitted. The molding 11 thus fitted to the glass plate 72 may be quenched by jets of air 45 emitted from a nozzle 44.

Now, a method for disassembling the transparent plate with a molding 10 from the body panel 70A will be explained.

Figure 5:
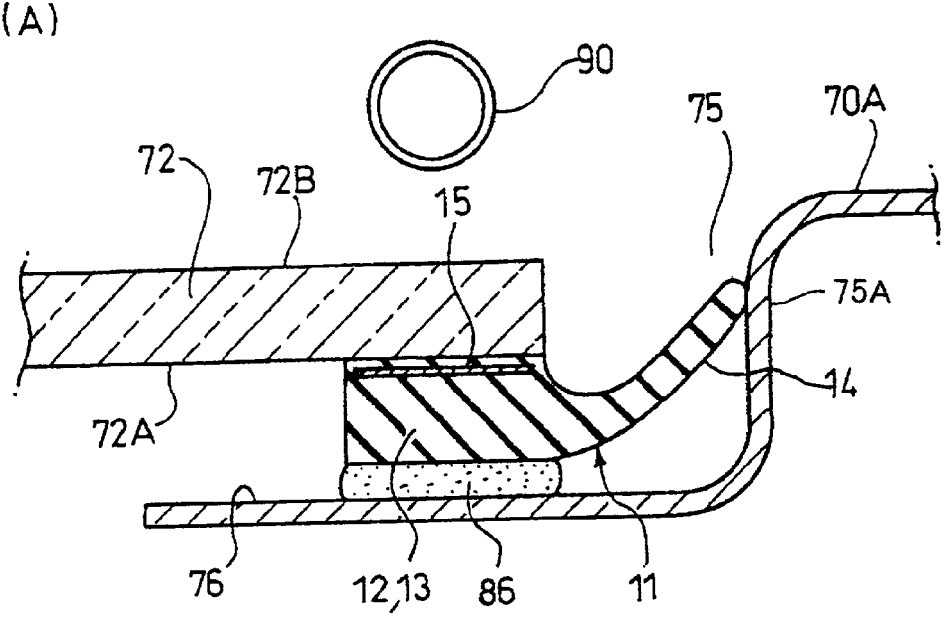
FIG. 5 includes cross-sectional views showing an example of the method for disassembling the transparent plate according to the present invention.
Figure 5:
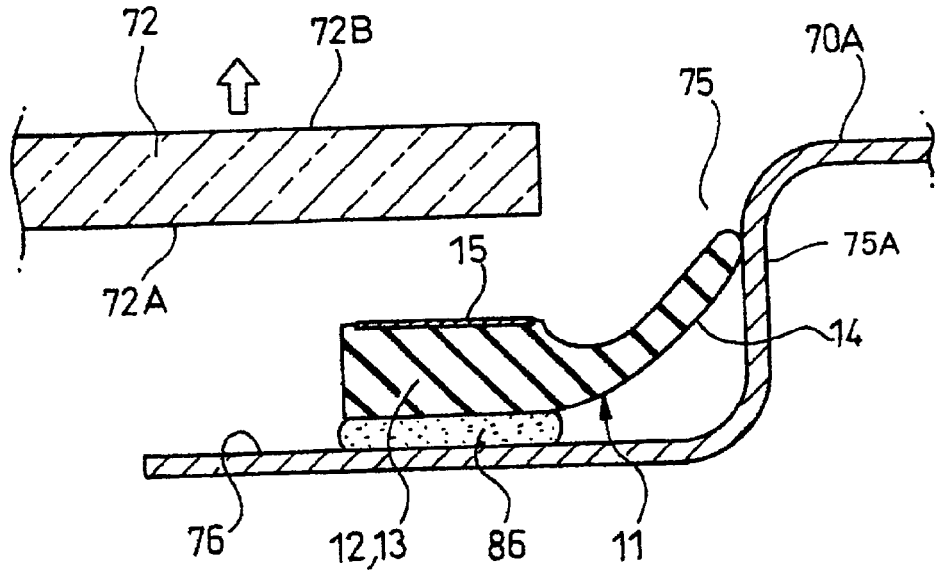
Figure 6:
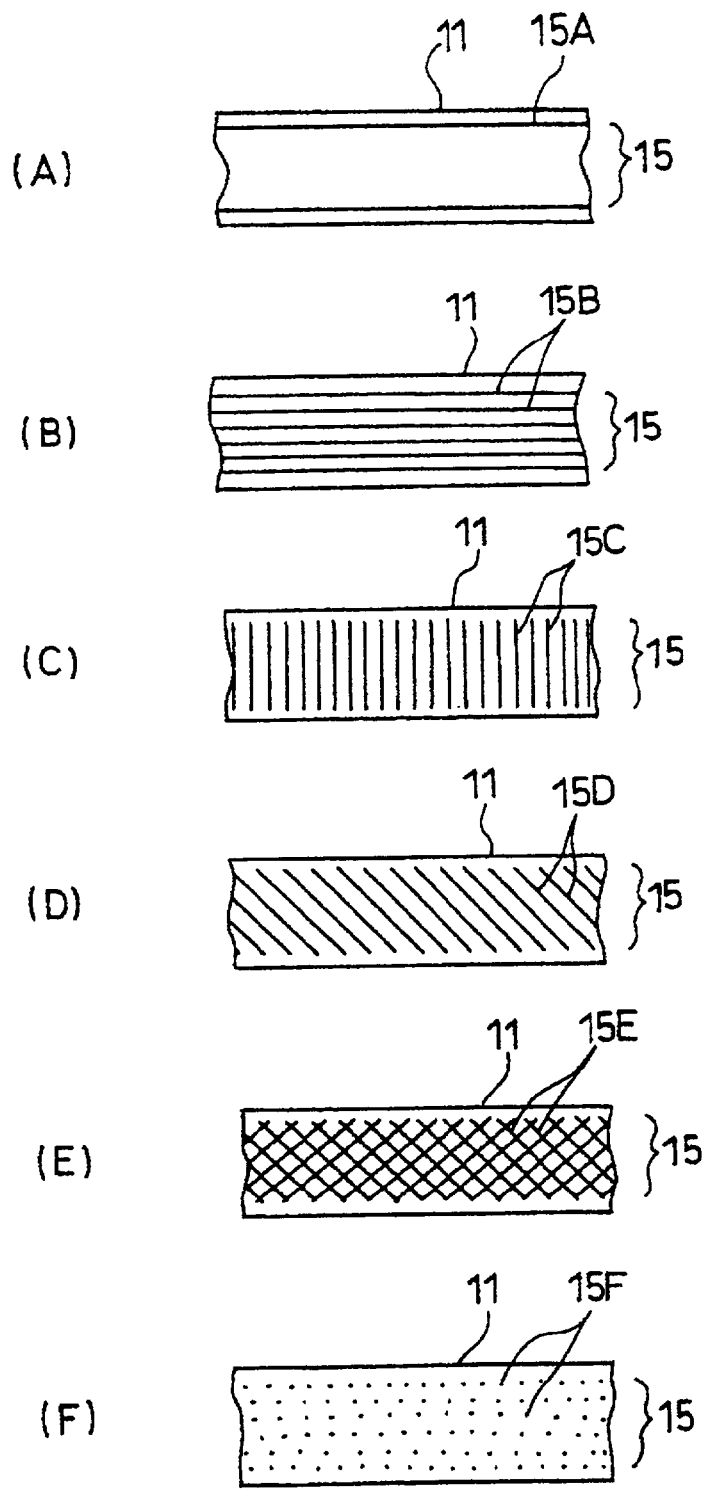
FIG. 6 includes views showing examples of the electrically conductive member according to the present invention.

When the transparent plate with a molding 10 is disassembled from the body panel 70A for recycling or another purpose, an eddy current generator 90, such as a coil, is brought near a surface of the glass plate 72 as shown in FIG. 5(A). This action generates an eddy current in the electrically conductive member 15 to heat the electrically conductive member 15 since the electrically conductive member 15 is embedded in the molding 11 so as to extend parallel to the interior side of the glass plate 72. The molding 11 is softened or melted by the heat generation of the electrically conductive member 15 since the molding is molded from thermoplastic resin. It is possible to easily pull only the glass plate 72 off the body panel 70A by lifting the glass plate 72 as shown in FIG. 5(B) on a phase wherein the molding 11 has been properly softened or melted.

As explained, it is possible to easily disassemble the transparent plate with a molding 10 by only the provision of the eddy current generator 90, such as a coil, without using a special tool or device. It is possible to quickly forward only the glass plate 72 to a recycling process.

As the eddy current generator 90, there may be used one which extends along the peripheral edge of the glass plate 72 to generate an eddy current in the entire area of the electrically conductive member 15. There may be used a short length of eddy current generator which generates an eddy current only in a portion of the electrically conductive member 15. In that case, the heat that has been generated from that portion of the electrically conductive member 15 by the eddy current can be rapidly transferred to the entire area of the electrically conductive member 15.

As to the electrically conductive member 15, there are examples shown in FIGS. 6(A)–6(F) as cross-sectional views taken along line VI—VI of FIG. 1.

In the one shown in (A), the electrically conductive member 15 is formed from a band plate shape of electrically conductive member 15A.

In the one shown in (B), the electrically conductive member 15 in a strip shape is formed by providing a plurality of filiform electrically conductive members 15B in parallel to each other along a longitudinal direction of the molding 11.

In the one shown in (C), the electrically conductive member 15 in a strip shape is formed by providing a plurality of short and filiform electrically conductive members 15C in parallel to each other along a width direction of the molding 11.

In the one shown in (D), the electrically conductive member 15 in a strip shape is formed by providing a plurality of filiform electrically conductive members 15D in parallel to each other so as to extend slantwise with respect to the longitudinal direction of the molding 11.

In the one shown in (E), the electrically conductive member 15 in a strip shape is formed by providing electrically conductive member 15E having a network shape.

In the one shown in (F), the electrically conductive member 15 in a strip shape is provided by distributing electrically conductive members 15E having a granular shape in strip fashion.

Although explanation of the first embodiment has been made with respect to the case of one-side molding, the present invention is also applicable to a case wherein the molding is bonded to the interior side and end face of the peripheral edge of the glass plate. This example is shown as a second embodiment in FIG. 7. In the explanation of the embodiments stated below, parts similar to the parts explained with respect to FIG. 1 or FIG. 2 are indicated by identical or corresponding reference numerals in the drawings, and explanation of these parts will be simplified or omitted.

Figure 7:
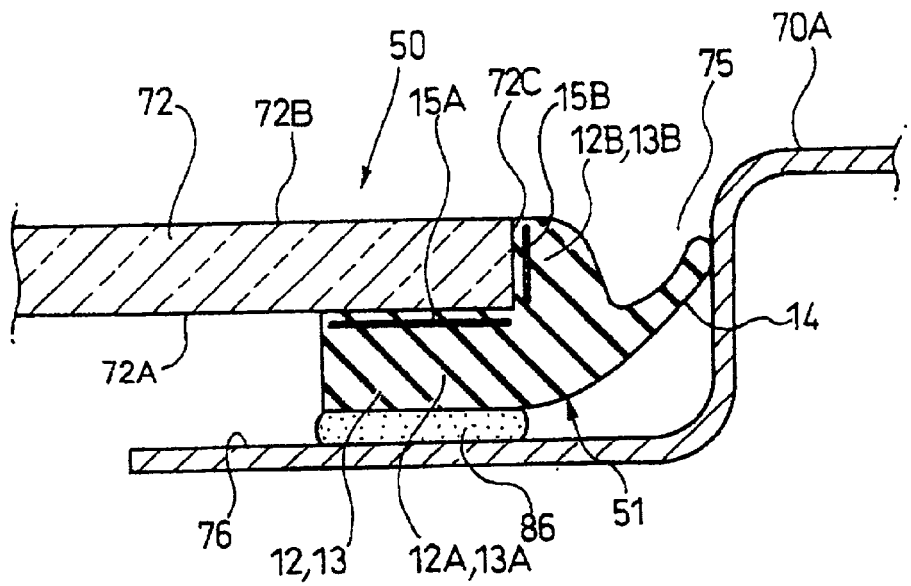
FIG. 7 is a fragmentary perspective view of the transparent plate with a molding according to a second embodiment of the present invention.

The transparent plate 50A shown in FIG. 7 comprises the glass plate 72 and a molding 51 fitted to a peripheral portion thereof.

The molding 51 has an upper attaching portion 12 and lateral attaching portion 13 formed with interior side bonding portions 12A and 13A to be bonded the interior side 72A of the peripheral portion of the glass plate 72 and end face bonding portions 12B and 13B to be bonded the end face 72C of the peripheral portion of the glass plate 72, and the interior side bonding portions 12A and 13A and the end face bonding portions 12B and 13B have different electrically conductive members 15A and 15B embedded therein.

When the transparent plate 50A is disassembled from the body panel 70A, an eddy current generator, such as a coil, is brought near a surface of the transparent plate 72A as well. Thus, the electrically conductive members 15A on the interior side and the electrically conductive members 15B on the end face side can generate heat therein to soften or melt the molding 51, allowing only the transparent plate 72 to be easily disassemble.

Figure 8:
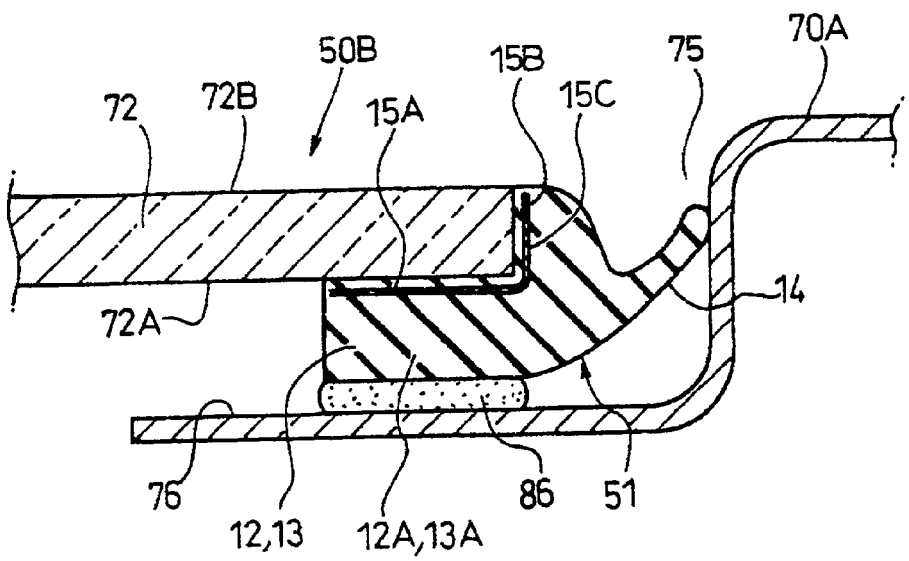
FIG. 8 is a fragmentary perspective view of the transparent plate with a molding according to a third embodiment of the present invention.
Figure 9:
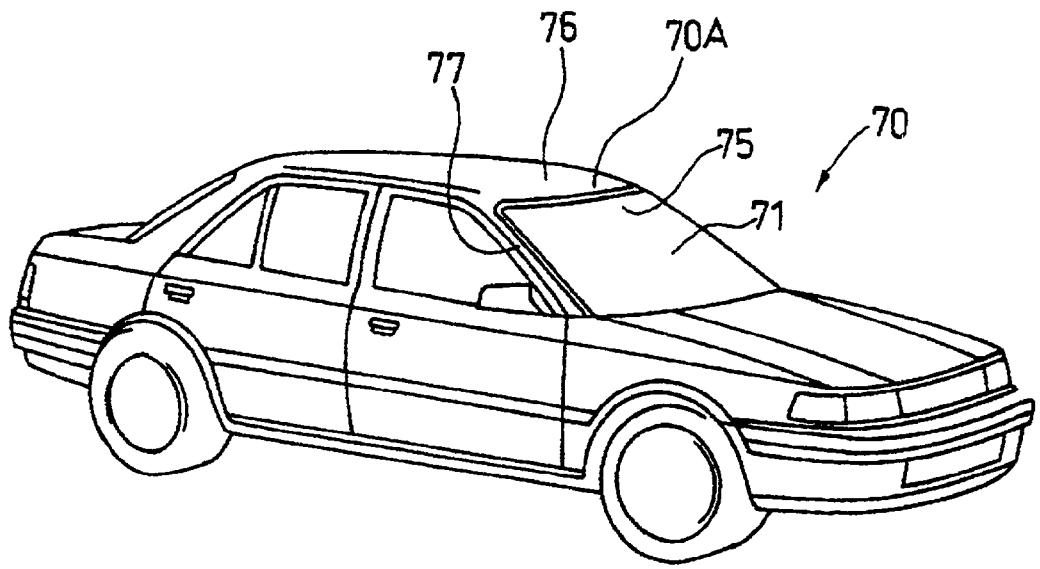
FIG. 9 is a perspective view showing an automobile with a transparent plate with a molding utilized therein.

As the transparent plate 50B according to a third embodiment shown in FIG. 8, the electrically conductive member 15A on the interior side and the electrically conductive member 15B of the end face side of the glass plate 72 may be formed by a single electrically conductive member 15C, which has an L-character shape in section and is insert-molded in the molding.

In the three embodiments, illustration has been made with respect to the case wherein the electrically conductive member or the electrically conductive members are embedded in the molding. Since the method for disassembling a transparent plate according to the present invention provides a simple disassembling method to utilize the generation of eddy currents to heat the electrically conductive member or the electrically conductive members, the electrically conductive member or the electrically conductive members may be also provided as follows. Specifically, the electrically conductive member or the electrically conductive members are provided on the glass plate. Specific examples are one wherein electrically conductive ceramic paste, which contains, e.g., silver, is fired on the glass plate to form a fired member of electrically conductive print thereon, and one wherein an electrically conductive tape is affixed on the glass plate.

From the viewpoint that the generation of heat in the electrically conductive member or the electrically conductive members can be effectively utilized for softening or melting of the molding, it is preferable that the electrically conductive member or the electrically conductive members are insert-molded in the molding.

In the present invention, it is preferable to bring the eddy current generator near the glass plate from an exterior side of the glass plate. In order to effectively generate the eddy current in the electrically conductive member, it is preferable to locate the eddy current generator so as to confront a portion of the glass plate where the molding is fitted. The reason is that it is difficult to bring the eddy current generator near the glass plate from the interior side of the portion of the glass plate where the molding is fitted.

The effectiveness of the method for disassembling a transparent plate according to the present invention will be described by examples in the case of provision of an electrically conductive member on a glass plate. Table 1 shows data with respect to the case wherein the same coil for generating an eddy current in a portion of each of electrically conductive members was brought near under different conditions in examples (Examples 1–7) where a fired member of electrically conductive print (hereinbelow, referred to as "the Ag print") containing silver was provided as the electrically conductive member on the interior side of the peripheral edge of a glass plate (300 mm×300 mm), and examples (Examples 8–10) where the Ag print was provided as the electrically conductive member on the interior side of the peripheral edge of a glass plate (300 mm×300 mm) and was covered by a molding.

Table 1 also shows data with respect to the case wherein the same coil for generating an eddy current in a portion of each of electrically conductive members was brought near under different conditions in examples (Examples 11–13) where the Ag print and the molding for covering the Ag print were provided on the interior side of the peripheral edge of a glass plate (300 mm×300 mm), and the combination of the Ag print and the molding was bonded to an iron sheet through an urethane adhesive; and an example (Example 14) where the Ag print and the molding for covering the Ag print were provided on the interior side of the peripheral edge of a glass plate (700 mm×400 mm, the actual dimensions of a sidelight), and the combination of the Ag print and the molding was bonded to an iron sheet through an urethane adhesive.

TABLE 1

| | Heating time in sec. | Coil position | Glass temperature | Removing force | Remark |
|---|---|---|---|---|---|
| Ex. 1 | 5 seconds | 0 | — | — | Glass fractured |
| Ex. 2 | 5 seconds | 5 mm | — | — | Glass fractured |
| Ex. 3 | 5 seconds | 10 mm | — | — | Glass fractured |
| Ex. 4 | 5 seconds | 15 mm | 78° C. | — | |
| Ex. 5 | 10 seconds | 20 mm | 124° C. | — | |
| Ex. 6 | 15 seconds | 20 mm | 178° C. | — | |
| Ex. 7 | 20 seconds | 20 mm | 206° C. | — | |
| Ex. 8 | 20 seconds | 20 mm | — | — | Unstuck |
| Ex. 9 | 25 seconds | 20 mm | — | — | Unstuck |
| Ex. 10 | 30 seconds | 20 mm | — | — | Unstuck |
| Ex. 11 | 30 seconds | 20 mm | — | — | |
| Ex. 12 | 30 seconds | 10 mm | — | — | Glass fractured |
| Ex. 13 | 30 seconds | 15 mm | — | 49N | Disassembled |
| Ex. 14 | 30 seconds | 15 mm | — | 90N | Disassembled |

In Example 1, the heating time was set at 5 sec, and the coil position (the distance from the glass plate) was set at 0 mm. The result was that the glass plate was fractured.

In Example 2, the heating time was set at 5 sec, and the coil position was set at 5 mm. The result was that the glass plate was fractured.

In Example 3, the heating time was set at 5 sec, and the coil position was set at 10 mm. The result was that the glass plate was fractured.

In Example 4, the heating time was set at 5 sec, and the coil position was set at 15 mm. The result was that the glass plate had a temperature of 78° C.

In Example 5, the heating time was set at 10 sec, and the coil position was set at 20 mm. The result was that the glass plate had a temperature of 124° C.

In Example 6, the heating time was set at 15 sec, and the coil position was set at 20 mm. The result was that the glass plate had a temperature of 178° C.

In Example 7, the heating time was set at 20 sec, and the coil position was set at 20 mm. The result was that the glass plate had a temperature of 206° C.

In Example 8, the heating time was set at 20 sec, and the coil position was set at 20 mm. The result was that the molding was unstuck from the glass plate.

In Example 9, the heating time was set at 25 sec, and the coil position was set at 20 mm. The result was that the molding was unstuck from the glass plate.

In Example 10, the heating time was set at 30 sec, and the coil position was set at 20 mm. The result was that the molding was unstuck from the glass plate.

In Examples 8–10, the removing force, which was required to unstick each of the moldings, varies from Example to Example. Specifically, the molding in Example 9 was unstuck by a smaller pulling force than that in Example 8, and the molding in Example 10 was unstuck by a smaller pulling force than that in Example 9.

In Example 11, the heating time was set at 30 sec, and the coil position was set at 20 mm. The result was that the glass plate was not disassembled from the iron sheet.

In Example 12, the heating time was set at 30 sec, and the coil position was set at 10 mm. The result was that the glass plate was fractured.

In Example 13, the heating time was set at 30 sec, and the coil position was set at 15 mm. The result was that the glass plate was disassembled from the iron sheet. At that case, the glass plate removing force was 49 N.

In Example 14, the heating time was set at 30 sec, and the coil position was set at 15 mm. The result was that the glass plate was disassembled from the iron sheet. At that case, the glass plate removing force was 90 N.

The data reveal that the glass plate can be reliably disassembled by a small force by properly setting the coil position and the heating time. In particular, the glass plate can be prevented from being fractured due to heat by keeping the coil away from the glass plate by a distance of not less than 15 mm. The glass plate can be easily disassembled by setting the heating time at a value of not less than 30 sec.

In the cases of fitting the molding to the iron sheet by the adhesive, it is revealed that the electrically conductive member is required to be heated in sufficient fashion in consideration of heat release to the iron sheet.

The present invention is not limited to the respective embodiments stated earlier, and proper modification or improvement can be made in the present invention.

For example, a sealing member made of Butyl-rubber in place of the lip portion 14 as the elastic portion may be interposed between the molding and the window opening. Examples of the transparent plate are a plate for a backlight and a plate for a sidelight besides a plate for a windshield. As another method for unifying the molding to the transparent plate, there is a method wherein the molding is unified to the transparent plate when the molding is formed by injection molding.

The molding may be formed in such a shape that the molding is bonded to the interior and exterior sides and the end face of the transparent plate. In that case, the molding is required to be softened or melted in sufficient fashion in order to disassemble the transparent plate since the molding has the attaching portions formed in a substantially U-character shape in section. It is preferable from the following viewpoint that the molding is formed in such a shape to be bonded only to the interior side and the end face of the transparent plate as in the first to the third embodiments or only to the end face. In other words, when the molding is formed in any one of the shapes in the first to the third embodiments, the molding and the transparent plate are bonded together without being mechanically engaged together. The transparent plate can be easily disassembled when the molding has been softened or melted to some extent. From this viewpoint, it is preferable that the molding is formed in such a shape to be bonded only to the interior side and the end face of the transparent plate or only to the end face.

Examples of the transparent plate are a glass plate and a transparent resin plate, such as a polycarbonate plate. From the viewpoint that the transparent plate is also heated, the present invention is in particular effective to a transparent plate made of glass. When the electrically conductive member is provided on the transparent plate, it is preferable from the viewpoint of production that a fired member of electrically conductive print with silver contained therein is utilized as the electrically conductive member for instance. When the electrically conductive member is insert-molded in the molding, it is preferable from the viewpoint of handling that the electrically conductive member is made of iron for instance. Other examples of the electrically conductive member are copper, aluminum or others.

INDUSTRIAL APPLICABILITY

As explained, the present invention has the electrically conductive member insert-molded in the thermoplastic resin molding to extend substantially parallel to the transparent plate surface. As a result, the molding, which has been bonded and fixed to a window opening of an automobile, can be easily disassembled from the window opening later. Since bringing the eddy current generator, such as a coil, near a surface of the transparent plate can cause the electrically conductive member to be heated so as to soften or melt the molding, the molding can be broken to easily disassemble the transparent plate, the electrically conductive member serving as a boundary. As a result, it becomes possible to facilitate recycling.

When the electrically conductive member is a substantially strip shape of electrically conductive member in the present invention, the molding can be disassembled in much easier fashion since a strip shape of heated region can be formed in the electrically conductive member. When the electrically conductive member is provided so as not to project from a surface of the molding, the transparent plate can be prevented from having a poor appearance.

In order to disassemble the transparent plate from the window opening, it is sufficient only to bring the eddy current generator near a surface of the transparent plate and generate heat in the electrically conductive member to soften or melt the molding. It is possible to facilitate recycling since it is possible to easily disassemble only the transparent plate as stated earlier.

The entire disclosure of Japanese Patent Application No. 11-354666 filed on Dec. 14, 1999 including specification, claims, drawings and summary are incorporated herein by reference in its entirety.

What is claimed is:

1. A transparent plate with a molding, comprising:
   the transparent plate to be assembled to a window opening of an automobile;
   a thermoplastic resin molding unified to a peripheral edge of the transparent plate, the molding including an attaching portion to be bonded to at least an interior side of the peripheral edge of the transparent plate and an elastic portion connected to the attaching portion so as to be capable of being in close contact with the window opening; and
   electrically conductive means insert-molded in the molding so as to not project from a surface of the molding and, whereby the electrically conductive means is configured to be heated by an eddy current.

2. The transparent plate according to claim 1, wherein the electrically conductive member is a substantially strip shape of electrically conductive member.

3. The transparent plate according to claim 1, wherein the attaching portion of the molding is bonded only to an interior side of the peripheral portion of the transparent plate or only to an interior side and an end face of the peripheral portion of the transparent plate.

4. The transparent plate of claim 1, wherein a thickness of said electrically conductive means varies from about 1 mm to about 2 mm.

5. A method for disassembling a transparent plate with a thermoplastic resin molding unified to a peripheral edge thereof from a window opening of an automobile with the transparent plate assembled thereto by heating the molding, comprising:
   preliminarily providing the transparent plate with an electrically conductive member so as to cover at least one portion of the electrically conductive member with the molding, the electrically conductive member extending substantially parallel to a transparent plate surface; and
   bringing an eddy current generator near a surface of the transparent plate to generate heat in the electrically conductive member, thereby softening or melting the molding, and applying an external force to the transparent plate to disassemble the transparent plate from the window opening of the automobile.

6. The method according to claim 5, further comprising bringing the eddy current generator near from an exterior side of the transparent plate.

7. The method according to claim 5, further comprising insert-molding the electrically conductive member in the molding.

8. The method according to claim 5, further comprising providing the electrically conductive member so as not to project from a surface of the molding.

9. The method according to claim 5, wherein the electrically conductive member is substantially strip-shaped.

10. The method according to claim 5, further comprising bringing the eddy current generator near the transparent plate with a distance of not less than 15 mm kept therebetween.

11. The method of claim 5, wherein a thickness of said electrically conductive member varies from about 1 mm to about 2 mm.

12. The method of claim 5, wherein bringing said eddy current generator to generate heat further comprises generating heat in a portion of said electrically conductive member.

13. The method of claim 5, wherein said electrically conductive member is an electrically conductive fired ceramic member disposed on said transparent plate.

14. A method for disassembling a transparent plate with a thermoplastic resin molding unified to a peripheral edge thereof from a window opening of an automobile with the transparent plate assembled thereto by heating the molding, comprising:

preliminarily providing the transparent plate with an electrically conductive member so as to cover at least one portion of the electrically conductive member with the molding, the electrically conductive member extending substantially parallel to a transparent plate surface;

bringing an eddy current generator near a surface of the transparent plate to generate heat in the electrically conductive member, thereby softening or melting the molding, and applying an external force to the transparent plate to disassemble the transparent plate from the window opening of the automobile; and energizing the eddy current generator for less than 30 sec to generate heat in the electrically conductive member.

15. A method for disassembling a transparent plate with a thermoplastic resin molding unified to a peripheral edge thereof from a window opening of an automobile with the transparent plate assembled thereto by heating the molding, comprising:

preliminarily providing the transparent plate with an electrically conductive member so as to cover at least one portion of the electrically conductive member with the molding, the electrically conductive member extending substantially parallel to a transparent plate surface;

bringing an eddy current generator near a surface of the transparent plate with a distance of not less than 15 mm kept therebetween to generate heat in the electrically conductive member, thereby softening or melting the molding, and applying an external force to the transparent plate to disassemble the transparent plate from the window opening of the automobile; and energizing the eddy current generator for less than 30 sec to generate heat in the electrically conductive member.

16. A combination of an eddy current generator and a transparent plate with a molding to facilitate removal of said transparent plate from a window opening, said combination comprising:

an eddy current generator to generate heat in an electrically conductive member;

at least said transparent plate to be assembled to said window opening and a thermoplastic resin molding unified to a peripheral edge of the transparent plate; and said molding including an attaching portion to be bonded to at least an interior side of the peripheral edge of the transparent plate and an elastic portion connected to the attaching portion so as to be capable of being in close contact with said window opening;

wherein the molding has said electrically conductive member insert-molded therein, said electrically conductive member extends substantially parallel to a surface of said transparent plate, and generation of said heat in said electrically conductive member causes softening or melting of said molding to facilitate removal of said transparent plate from said window opening.

17. A transparent plate with a molding, comprising:

the transparent plate to be assembled to a window opening of an automobile;

a thermoplastic resin molding unified to a peripheral edge of the transparent plate, the molding including an attaching portion to be bonded to at least an interior side of the peripheral edge of the transparent plate and an elastic portion connected to the attaching portion so as to be capable of being in close contact with the window opening; and an electrically conductive member being an electrically conductive fired ceramic member disposed on said transparent plate, and being configured to be heated by an eddy current generator.

18. A combination of an eddy current generator and a transparent plate with a molding to facilitate removal of said transparent plate from a window opening, said combination comprising:

an eddy current generator to generate heat in an electrically conductive member;

at least said transparent plate to be assembled to said window opening and a thermoplastic resin molding unified to a peripheral edge of the transparent plate; and said molding including an attaching portion to be bonded to at least an interior side of the peripheral edge of the transparent plate and an elastic portion connected to the attaching portion so as to be capable of being in close contact with said window opening; and, an electrically conductive member being an electrically conductive fired ceramic member disposed on said transparent plate, wherein generation of said heat in said electrically conductive member causes softening or melting of said molding to facilitate removal of said transparent plate from said window opening.

19. A transparent plate with a molding, comprising:

a transparent plate configured to be assembled to a window opening of an automobile;

a thermoplastic resin molding unified to a peripheral edge of the transparent plate, the molding including an attaching portion to be bonded to at least an interior side of the peripheral edge of the transparent plate and an elastic portion connected to the attaching portion so as to be capable of being in close contact with the window opening; and an electrically conductive member insert-molded in the molding, the electrically conductive member being provided so as not to project from a surface of the molding, and being configured to be heated by an eddy current.

* * * * *